United States Patent
Tokura et al.

(10) Patent No.: US 9,671,678 B2
(45) Date of Patent: Jun. 6, 2017

(54) FOCAL-PLANE SHUTTER AND OPTICAL APPARATUS

(71) Applicant: SEIKO Precision Inc., Matsudo-shi, Chiba (JP)

(72) Inventors: Shoichi Tokura, Matsudo (JP); Seiichi Oishi, Matsudo (JP)

(73) Assignee: SEIKO PRECISION INC., Matsudo-Shi (JP)

( * ) Notice: Subject to any disclaimer, the term of this patent is extended or adjusted under 35 U.S.C. 154(b) by 0 days.

(21) Appl. No.: 15/227,478

(22) Filed: Aug. 3, 2016

(65) Prior Publication Data
US 2017/0052428 A1 Feb. 23, 2017

(30) Foreign Application Priority Data
Aug. 21, 2015 (JP) .................. 2015-163730

(51) Int. Cl.
G03B 9/40 (2006.01)
G02B 27/00 (2006.01)

(52) U.S. Cl.
CPC .......... *G03B 9/40* (2013.01); *G02B 27/0006* (2013.01)

(58) Field of Classification Search
CPC .............. G03B 9/40; G03B 9/36; G03B 9/18
See application file for complete search history.

(56) References Cited

U.S. PATENT DOCUMENTS

| | | | | |
|---|---|---|---|---|
| 2002/0114628 A1* | 8/2002 | Nakano | ............ | G03B 9/18 396/484 |
| 2002/0197078 A1* | 12/2002 | Toyoda | ............ | G03B 9/18 396/484 |
| 2016/0195796 A1* | 7/2016 | Oishi | ............ | G03B 9/40 396/454 |

FOREIGN PATENT DOCUMENTS

JP  2011-170226 A  9/2011

* cited by examiner

*Primary Examiner* — W B Perkey
(74) *Attorney, Agent, or Firm* — Brinks Gilson & Lione

(57) ABSTRACT

A focal-plane shutter capable of suppressing production of foreign matter is provided. The focal-plane shutter includes a base plate, rear curtain drive arms, a blade that is driven by the rear curtain drive arms, and an elastically deformable cushioning member that comes into contact with the blade that moves from a retracted position to an unfolded position. The blade extends in a first direction. The rear curtain drive arms are swingable around the centers of swing motion provided on one side of the blade in the first direction. The cushioning member has a contact section that comes into contact with a side edge of the blade, a holding section that is arranged on the side opposite the blade with the contact section therebetween, and a connecting section that connects the contact section and the holding section to each other. The connecting section inclines with respect to a second direction perpendicular to the first direction and extends toward the centers of swing motion.

5 Claims, 9 Drawing Sheets

FOCAL-PLANE SHUTTER AND OPTICAL APPARATUS

RELATED APPLICATIONS

This application claims priority under 35 U.S.C. §119 to Japanese Patent Application No. 2015-163730 filed on Aug. 21, 2015, the entire content of which is hereby incorporated by reference.

BACKGROUND OF THE INVENTION

Field of the Invention

The present invention relates to a focal-plane shutter and an optical apparatus.

Background Art

An optical apparatus, for example, a digital camera and a still camera, employs a focal-plane shutter. In the action of the focal-plane shutter, blades are caused to transition between an unfolded state and a retracted state. The focal-plane shutter includes a cushioning member that comes into contact with the blades in a blade movement end position to stop the blades. The cushioning member, which comes into contact with the blades in the blade movement end position, suppresses a bounce of the blades moving at high speed.

For example, a blade drive apparatus (focal-plane shutter) described in JP-A-2011-170226 includes a substrate having an opening, a blade that moves between a position where the blade retracts from the opening and a position where the blade overlaps with at least part of the opening, and a cushioning member that has a loop-like shape, has elasticity, comes into contact with the blade at an end of the blade movement range, and is so deformable that the loop-like shape is distorted when the cushioning member comes into contact with the blade.

JP-A-2011-170226 states that the blade drive apparatus can suppress a bounce of the blade that occurs when the blade comes into contact with the cushioning member.

In the blade drive apparatus of related art described above, the cushioning member has a sandwiched section (holding section) which is sandwiched between a first holding section and a second holding section formed as part of a substrate, a non-sandwiched section (contact section) which faces the sandwiched section and with which the blade comes into contact, and a pair of connecting sections which connect the sandwiched section and the non-sandwiched section to each other. The blade extends along a direction that intersects the moving direction of the blade (hereinafter referred to as "first direction"). The connecting sections of the cushioning member extend along the direction perpendicular to the first direction (hereinafter referred to as "second direction").

The blade is linked with a pair of arms swingably supported by the substrate, and the parallel link mechanism translates the blade around the center of swing motion of the arms. The blade therefore moves both in the first and second directions.

However, when the connecting sections, which extend in the second direction, receive force from the blade in the second direction via the non-sandwiched section, the connecting sections are compressed in the second direction and unlikely to bend in the first direction. As a result, displacement of the connecting sections is restricted even when the connecting sections receive force from the blade in the first direction via the non-sandwiched section, and displacement of the non-sandwiched section, which is supported by the sandwiched section via the connecting sections, in the first direction is therefore restricted. The blade therefore slides in the first direction relative to the non-sandwiched section. As a result, the non-sandwiched section could undesirably wear and produce foreign matter.

SUMMARY OF THE INVENTION

The invention provides a focal-plane shutter and an optical apparatus capable of suppressing production of foreign matter.

A focal-plane shutter according to the invention includes a substrate that has an opening, an arm that is so supported by the substrate as to be swingable, a blade that is driven by the arm and moves between a retracted position where the blade retracts from the opening and an unfolded position where the blade so unfolds as to overlap with at least part of the opening, and an elastically deformable cushioning member that comes into contact with the blade that moves from the retracted position to the unfolded position. The blade extends along a first direction that intersects a direction in which the blade moves from the retracted position to the unfolded position. The arm is swingable around a center of swing motion provided on one side of the blade in the first direction. The cushioning member includes a contact section that comes into contact with a side edge that is an edge of the blade and located on a downstream side in the movement direction of the blade, a holding section that is arranged on a side opposite the blade with the contact section therebetween, set apart from the contact section, and held by the substrate, and a connecting section that connects the contact section and the holding section to each other. The connecting section inclines with respect to a second direction perpendicular to the first direction and extends toward the center of swing motion.

According to the invention, since the connecting section of the cushioning member inclines with respect to the second direction and extends toward the center of swing motion around which the arm swings, the connecting section can readily bend as compared with the configuration of related art in which the connecting sections extend in the second direction. Therefore, when the side edge of the blade comes into contact with the contact section, the contact section can be readily displaced along with the blade, and a situation in which the contact section and the side edge of the blade slide on each other can therefore be avoided, whereby the amount of wear of the contact section can be reduced. Production of foreign matter can therefore be suppressed.

In the focal-plane shutter described above, the cushioning member is desirably formed in an annular shape.

According to the invention, the cushioning member can be formed of the holding section, the contact section, and the connecting section, which is formed of a pair of connecting sections that connect end portions of the holding section and end portions of the contact section to each other.

In the focal-plane shutter described above, it is desirable that at least part of the arm is so arranged as to be flush with the side edge of the blade when the blade is in the unfolded position, and that the part of the arm along with the blade comes into contact with the contact section.

According to the invention, since the arm along with the blade comes into contact with the contact section, the movement of the arm, which moves along with the blade, can be reliably stopped.

In the focal-plane shutter described above, the contact section is desirably arranged in a position corresponding to an inner portion between opposite ends of the blade in the unfolded position.

According to the invention, a situation in which an end portion of the blade comes into contact with the contact section can be avoided, whereby a situation in which an end portion of the blade scrapes the contact section and produces foreign matter can be avoided.

An optical apparatus according to the invention includes any of the focal-plane shutters described above.

According to the invention, the optical apparatus is capable of suppressing production of foreign matter.

According to the invention, since the connecting section of the cushioning member inclines with respect to the second direction and extends toward the center of swing motion around which the arm swings, the connecting section can readily bend as compared with the configuration of related art in which the connecting sections extend in the second direction. Therefore, when the side edge of the blade comes into contact with the contact section, the contact section can be readily displaced along with the blade, and a situation in which the contact section and the side edge of the blade slide on each other can therefore be avoided, whereby the amount of wear of the contact section can be reduced. Production of foreign matter can therefore be suppressed.

DETAILED DESCRIPTION OF THE INVENTION

An embodiment of the invention will be described below with reference to the drawings.
(Optical Apparatus)

Figure 1:
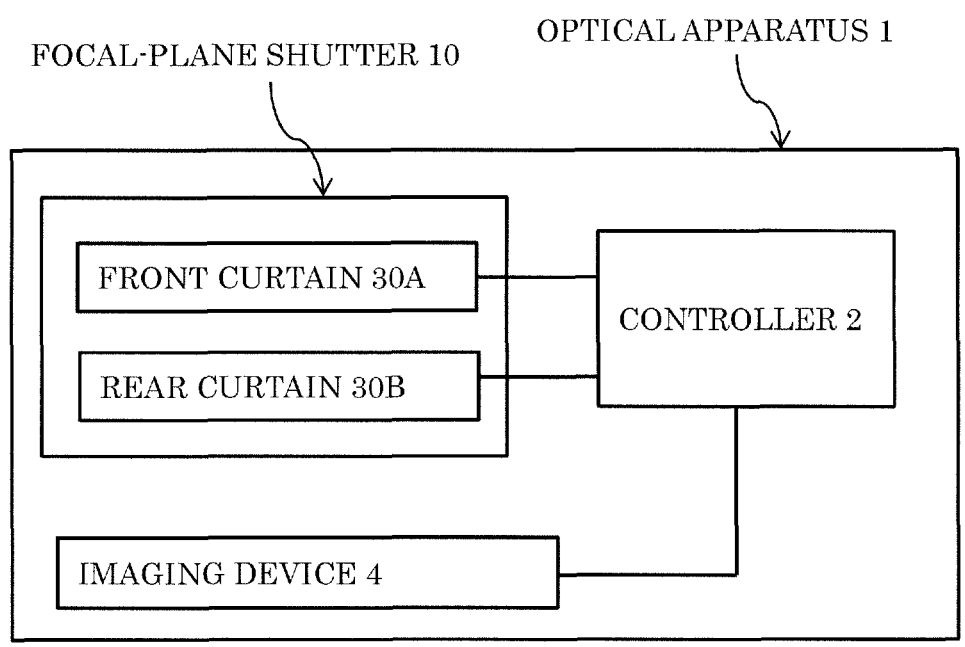
FIG. 1 is a block diagram of an optical apparatus.

FIG. 1 is a block diagram of an optical apparatus.

An optical apparatus 1 is, for example, a digital camera or a still camera and includes a controller 2, an imaging device 4, and a focal-plane shutter 10, as shown in FIG. 1.

The controller 2 controls the overall action of the optical apparatus 1 and includes a CPU (central processing unit), a ROM (read only memory), a RAM (random access memory), and other components. The controller 2 controls the action of the focal-plane shutter 10, which will be described later.

The imaging device 4 is, for example, a CCD (charge coupled device) or a CMOS (complementary metal oxide semiconductor) image sensor and converts a subject image formed by light into an electric signal.

The optical apparatus 1 further includes, although not shown in FIG. 1, a lens and other components for focal length adjustment.
(Focal-Plane Shutter)

Figure 2:
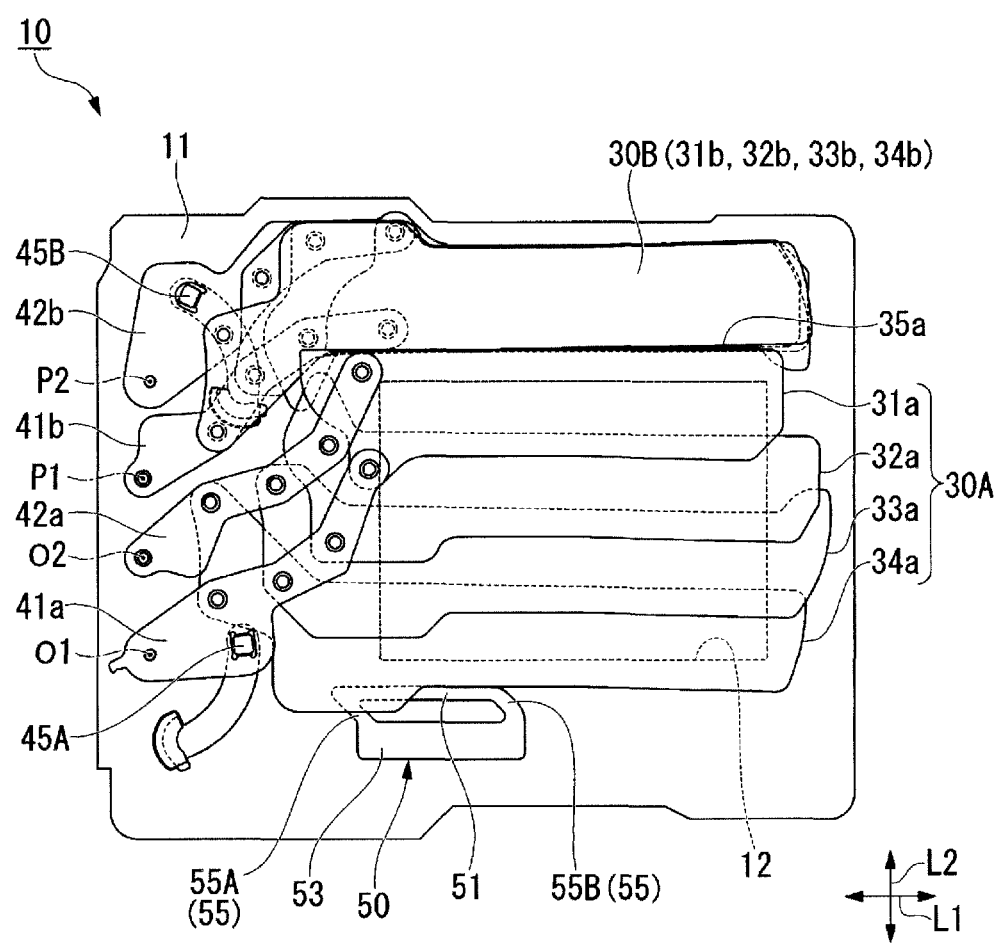
FIG. 2 is a front view of a focal-plane shutter and shows an initial state.
Figure 3:
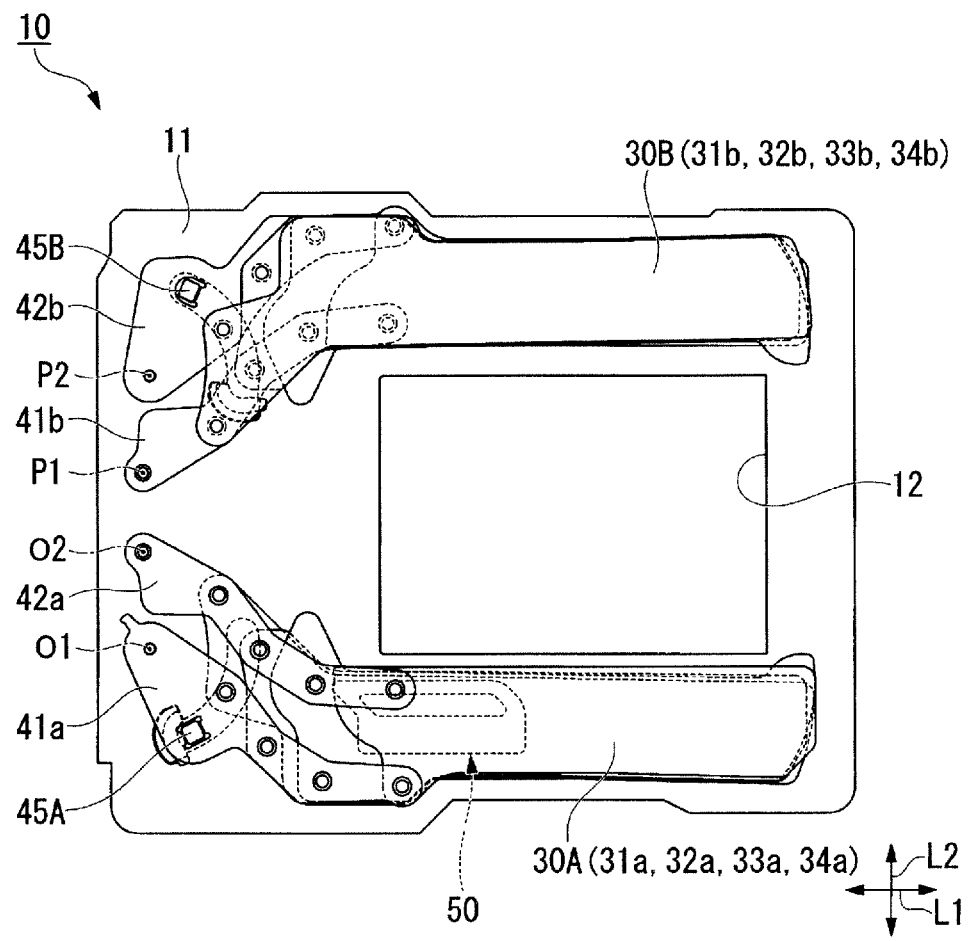
FIG. 3 is a front view of the focal-plane shutter and shows a state during light exposure.
Figure 4:
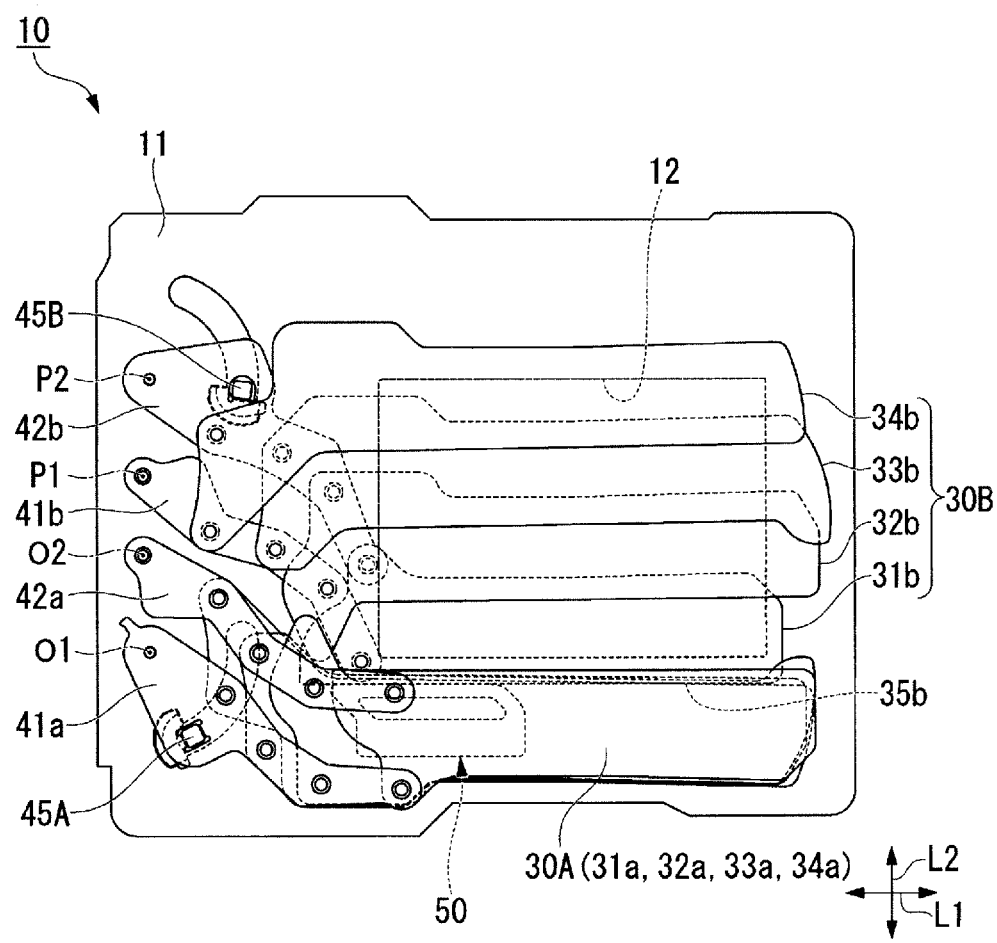
FIG. 4 is a front view of the focal-plane shutter and shows a state immediately after the light exposure ends.

FIGS. 2 to 4 are front views of the focal-plane shutter. FIG. 2 shows an initial state (charged state). FIG. 3 shows a state during light exposure. FIG. 4 shows a state immediately after the light exposure ends (light exposure end state).

The focal-plane shutter 10 primarily includes a base plate 11 (substrate), front curtain drive arms 41a and 42a and rear curtain drive arms 41b and 42b, which are swingably supported by the base plate 11, blades 31a to 34a, which are driven by the front curtain drive arms 41a and 42a, blades 31b to 34b, which are driven by the rear curtain drive arms 41b and 42b, a cushioning member 50, which comes into contact with the blade 31b, as shown in FIG. 2.

The base plate 11 is made of a synthetic resin and has a rectangular opening 12. Among the members that form the focal-plane shutter 10, the base plate 11 is a member arranged in a position closest to lenses in the optical apparatus 1.

A blade receiving plate that is not shown is attached to the base plate 11. The blade receiving plate is so attached to the base plate 11 that the blades 31a to 34a and 31b to 34b, the front curtain drive arms 41a and 42a, the rear curtain drive anus 41b and 42b, and other components are accommodated between the blade receiving plate and the base plate 11. The blade receiving plate is made, for example, of a synthetic resin and has a rectangular opening. The opening of the blade receiving plate is so formed as to roughly coincide with the opening 12 of the base plate 11 in a front view.

A partitioning plate that is not shown is so arranged between the base plate 11 and the blade receiving plate (not shown) as to extend along the base plate 11 and the blade receiving plate. The partitioning plate is made of a synthetic resin, for example, PET (polyethylene terephthalate), and has a rectangular opening. The opening of the partitioning plate is so formed as to roughly coincide with the opening 12 of the base plate 11 and the opening of the blade receiving plate in the front view.

The blades 31a to 34a and 31b to 34b are unfolded in a state in which the opening 12 is closed and tucked away in a state in which the opening 12 is open with the blades 31a to 34 layered on each other and the blades 31b to 34b layered on each other (see FIGS. 2 to 4). The blades 31a to 34a and 31b to 34b move between a retracted position where the blades retract from the opening 12 and an unfolded position where the blades so unfold as to overlap with at least part of the opening 12. The unfolded position refers to a position where the blades 31a to 34a or the blades 31b to 34b completely close the opening 12. In the following description, a state in which the blades 31a to 34a or 31b to 34b close the opening 12 in the unfolded position is referred to as an "expanded state." Further, a state in which the blades 31a to 34a are layered on each other and the blades 31b to 34b are layered on each other in the retracted position is referred to as a "overlapped state."

Each of the blades 31a to 34a and 31b to 34b is made of a synthetic resin and so formed as to be thin. The blades 31a to 34a and 31b to 34b intersect the direction in which the blades move from the retracted position to the unfolded position and extend along the longitudinal direction of the opening 12. In the following description, the direction in which the blades 31a to 34a and 31b to 34b extend is defined as a first direction L1. Further, the direction perpendicular to the first direction L1 (widthwise direction of opening 12) is defined as a second direction L2. The direction perpendicular to the first direction L1 and the second direction L2 coincides with the direction in which the opening 12 passes through the base plate 11 (optical axis direction of optical apparatus 1). The blades 31a to 34a or 31b to 34b are not necessarily made of a synthetic resin. The blades 31a to 34a and 31b to 34b may instead be made of a metal or a carbon fiber composite material.

The four blades 31a to 34a form a front curtain 30A. The front curtain 30A is disposed between the blade receiving plate (not shown) and the partitioning plate (not shown). The four blades 31b to 34b form a rear curtain 30B. The rear curtain 30B is disposed between the base plate 11 and the partitioning plate (not shown). FIG. 2 shows a case where the front curtain 30A is in the expanded state and the rear curtain 30B is in the overlapped state. FIG. 3 shows a case where the front curtain 30A and the rear curtain 30B are both in the overlapped state. FIG. 4 shows a case where the front curtain 30A is in the overlapped state and the rear curtain 30B is in the expanded state. The front curtain 30A and the rear curtain 30B are so provided in the overlapped state as to be located on one side and the other side of the opening 12, respectively, in the second direction L2 (see FIG. 3).

The front curtain 30A is linked with the front curtain drive arms 41a and 42a. Each of the front curtain drive arms 41a and 42a is formed of a thin plate made of a metal so that the strength thereof is maintained. A base end portion of the front curtain drive arm 41a is so supported by the base plate 11 as to be swingable around a center of swing motion O1. A base end portion of the front curtain drive arm 42a is so supported by the base plate 11 as to be swingable around a center of swing motion O2. The front curtain drive arm 42a is arranged in a position shifted from the front curtain drive arm 41a toward the other side in the second direction L2. The centers of swing motion O1 and O2 are provided in positions shifted from the blades 31a to 34a toward one side in the first direction L1.

The blade 31a is rotatably linked with front end portions of the front curtain drive arms 41a and 42a. The blade 32a is rotatably linked with the front curtain drive arms 41a and 42a, specifically, portions thereof shifted toward the base end thereof from the portions where the blade 31a is linked therewith. The blade 33a is rotatably linked with the front curtain drive arms 41a and 42a, specifically, portions thereof shifted toward the base end thereof from the portions where the blade 32a is linked with. The blade 34a is rotatably linked with the front curtain drive arms 41a and 42a, specifically, portions thereof shifted toward the base end thereof from the portions where the blade 33a is linked therewith. Each of the blades 31a to 34a, along with the front curtain drive arms 41a and 42a, functions as a parallel link mechanism. A front end portion of the front curtain drive arm 42a is located inside the circumferential edge of the blade 31a when viewed in the direction in which the opening 12 passes through the base plate 11.

Among the blades 31a to 34a, which form the front curtain 30A, the blade 31a is located on the most downstream side in the direction in which the front curtain 30A moves when it moves from the retracted position to the unfolded position (hereinafter referred to as "at the time of unfolding"). A side edge 35a, which is a side edge of the blade 31a and located on the downstream side in the movement direction of the blade 31a at the time of unfolding, is formed linearly along the first direction L1.

The rear curtain 30B is linked with the rear curtain drive arms 41b and 42b, as shown in FIG. 4. Each of the rear curtain drive arms 41b and 42b is formed of a thin plate made of a metal so that the strength thereof is maintained, as in the case of the front curtain drive arms 41a and 42a. A base end portion of the rear curtain drive arm 41b is so supported by the base plate 11 as to be swingable around a center of swing motion P1. A base end portion of the rear curtain drive arm 42b is so supported by the base plate 11 as to be swingable around a center of swing motion P2. The rear curtain drive arm 41b is arranged in a position shifted from the rear curtain drive arm 42b toward the one side in the second direction L2. The centers of swing motion P1 and P2 are provided in positions shifted from the blades 31b to 34b toward the one side in the first direction L1.

The blade 31b is rotatably linked with front end portions of the rear curtain drive arms 41b and 42b. The blade 32b is rotatably linked with the rear curtain drive arms 41b and 42b, specifically, portions thereof shifted toward the base end thereof from the portions where the blade 31b is linked therewith. The blade 33b is rotatably linked with the rear curtain drive arms 41b and 42b, specifically, portions thereof shifted toward the base end thereof from the portions where the blade 32b is linked therewith. The blade 34b is rotatably linked with the rear curtain drive arms 41b and 42b, specifically, portions thereof shifted toward the base end thereof from the portions where the blade 33b is linked therewith. Each of the blades 31b to 34b, along with the rear curtain drive arms 41b and 42b, functions as a parallel link mechanism. A front end portion of the rear curtain drive arm 41b is located inside the circumferential edge of the blade 31b when viewed in the direction in which the opening 12 passes through the base plate 11.

Among the blades 31b to 34b, which form the rear curtain 30B, the blade 31b is located on the most downstream side in the direction in which the rear curtain 30B moves at the time of unfolding. A side edge 35b, which is a side edge of the blade 31b and located on the downstream side in the movement direction of the blade 31b at the time of unfolding, is formed linearly along the first direction L1.

The base plate 11 is provided with a front curtain drive lever 45A for driving the front curtain drive arm 41a and a rear curtain drive lever 45B for driving the rear curtain drive arm 42b. Each of the front curtain drive lever 45A and the rear curtain drive lever 45B is so supported by the base plate 11 as to be swingable over a predetermined range. Specifically, the front curtain drive lever 45A is so supported as to be swingable around an axis set through the base plate 11, and the front curtain drive lever 45A is inserted into a groove formed in the base plate 11 so that the swingable range of the front curtain drive lever 45A is restricted. The same holds true for the rear curtain drive lever 45B.

Each of the front curtain drive lever 45A and the rear curtain drive lever 45B is caused to swing by a drive source that is not shown. The drive source can, for example, be a driver that drives the drive lever 45A or 45B on the basis of an effect produced by an electromagnet and a spring or any other urging member or an electromagnetic actuator including a rotor, a stator, and a coil.

The front curtain drive arm 41a is linked with the front curtain drive lever 45A. The rear curtain drive arm 42b is linked with the rear curtain drive lever 45B. When the front curtain drive lever 45A swings, the front curtain drive arm 41*a* swings and moves the front curtain 30A. Similarly, when the rear curtain drive lever 45B swings, the rear curtain drive arm 42*b* swings and moves the rear curtain 30B.

Figure 5:
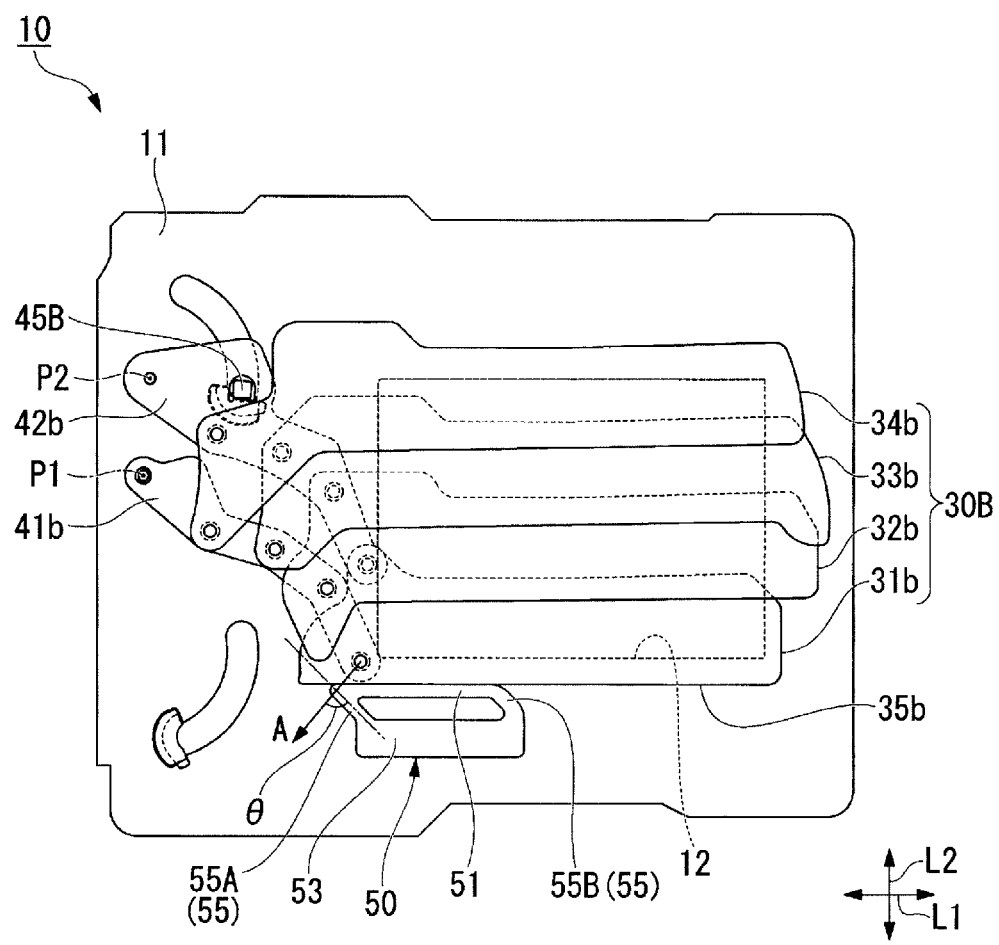
FIG. 5 describes the focal-plane shutter and is a front view primarily showing a base plate, a rear curtain, and a cushioning member.

FIG. 5 describes the focal-plane shutter and is a front view primarily showing the base plate, the rear curtain, and the cushioning member.

The cushioning member 50 is arranged between the base plate 11 and the blade receiving plate (not shown), as shown in FIG. 5. The cushioning member 50 is so formed as to be elastically deformable. The cushioning member 50 is formed of an elastic member made, for example, of a nitrile rubber or urethane foam material. The cushioning member 50 has an annular shape formed of a contact section 51, which comes into contact with the blade 31*b*, a holding section 53, which is arranged on the side opposite the blade 31*b* with the contact section 51 therebetween, set apart from the contact section 51, and held by the base plate 11, and a pair of connecting sections 55, which connect the contact section 51 and the holding section 53 to each other.

The contact section 51 is formed in a box-like shape extending along the first direction L1. The contact section 51 is arranged in a position where it comes into contact with the side edge 35*b* of the blade 31*b* in the unfolded position. The contact section 51 is further arranged in a position corresponding to an inner portion of the blade 31*b* in the first direction L1 between the opposite ends of the blade 31*b* in the unfolded position.

The holding section 53 is formed in a box-like shape extending along the first direction L1. The dimension of the holding section 53 in the first direction L1 is equal to the dimension of the contact section 51 in the first direction L1. The contact section 51 is shifted from the holding section 53 toward the one side in the first direction L1. The holding section 53 is fixed to the base plate 11, for example, with a bonding agent or an adhesive tape. The holding section 53 may instead be fixed to the base plate 11 by press fit of the holding section 53 into a recess or any other portion formed in the base plate 11.

A connecting section 55A, which is one of the pair of connecting sections 55, connects end portions of the contact section 51 and the holding section 53 on the one side in the first direction L1 to each other. A connecting section 55B, which is the other one of the pair of connecting sections 55, connects end portions of the contact section 51 and the holding section 53 on the other side in the first direction L1 to each other.

The connecting sections 55A and 55B, while extending from the holding section 53 to the contact section 51, incline with respect to the second direction L2 toward the centers of swing motion P1 and P2. The connecting section 55A and the connecting section 55B are parallel to each other.

The contact section 51 receives, from the blade 31*b* having come into contact with the contact section 51, force in the direction in which the rear curtain drive arms 41*b* and 42*b* swing. The blade 31*b* moves in the direction tangential to the circle drawn around the center of swing motion P1 and passing through the position where the blade 31*b* is linked with the rear curtain drive arm 41*b*, specifically, tangential to a portion of the circle where the blade 31*b* is linked with the rear curtain drive arm 41*b*. The tangential direction described above coincides with the direction tangential to the circle drawn around the center of swing motion P2 and passing through the position where the blade 31*b* is linked with the rear curtain drive arm 42*b*, specifically, tangential to a portion of the circle where the blade 31*b* is linked with the rear curtain drive arm 42*b*. An angle θ between the direction in which the connecting section 55A extends and the direction A tangential to the circle drawn around the center of swing motion P1 and passing through the position where the blade 31*b* is linked with the rear curtain drive arm 41*b*, specifically, tangential to a portion of the circle where the blade 31*b* is linked with the rear curtain drive arm 41*b* is desirably, for example, greater than or equal to 75° but smaller than or equal to 125°. In the present embodiment, the angle θ is set at about 90°. The relationship between the direction in which the connecting section 55B extends and the tangential direction A is the same as the relationship between the direction in which the connecting section 55A extends and the tangential direction A.

The action and effect of the focal-plane shutter 10 according to the present embodiment will be described below.

The focal-plane shutter 10 is so configured in the initial state that the front curtain 30A is in the expanded state and the rear curtain 30B is in the overlapped state, as shown in FIG. 2.

When a release button of the optical apparatus 1 is pressed in image capturing, the front curtain drive lever 45A rotates clockwise, as shown in FIG. 3. As a result, the front curtain 30A retracts from the opening 12 and achieves the overlapped state. On the other hand, the rear curtain 30B is maintained for a predetermined period in the overlapped state in which the rear curtain 30B has retracted from the opening 12. As a result, the state in which the opening 12 is open (light exposure state) is achieved.

After a predetermined period has elapsed since the release button was pressed, the rear curtain drive lever 45B rotates clockwise. As a result, the rear curtain 30B unfolds and closes the opening 12, as shown in FIG. 4. In this process, the side edge 35*b* of the blade 31*b* moving from the other side toward the one side in the second direction L2 and also moving from the other side toward the one side (toward centers of swing motion P1 and P2) in the first direction L1 comes into contact with the cushioning member 50. Single image capturing thus ends.

The direction in which the connecting sections 55 of the cushioning member 50 extend incline with respect to the second direction L2 toward the centers of swing motion P1 and P2. The blade 31*b* can therefore displace the contact section 51, which is supported by the connecting sections 55, along with the blade 31*b* while deforming the connecting sections 55.

A set lever that is not shown then rotates the front curtain drive lever 45A and the rear curtain drive lever 45B counterclockwise. As a result, the blades that form the front curtain 30A unfold and close the opening 12, and the blades that form the rear curtain 30B are layered on each other and retract from the opening 12, so that the initial state shown in FIG. 2 is restored.

As described above, according to the present embodiment, since the connecting sections 55 of the cushioning member 50 incline with respect to the second direction L2 and extend toward the centers of swing motion P1 and P2 around which the rear curtain drive arms 41*b* and 42*b* swing, the connecting sections 55 can readily bend as compared with the configuration of related art in which the connecting sections 55 extend in the second direction L2. Therefore, when the side edge 35*b* of the blade 31*b* comes into contact with the contact section 51, the contact section 51 can be readily displaced along with the blade 31*b*, and a situation in which the contact section 51 and the side edge 35*b* of the blade 31*b* slide on each other can therefore be avoided, whereby the amount of wear of the contact section 51 can be reduced. Production of foreign matter can therefore be suppressed.

A result of a simulation of the amount of distortion produced in the surface of the contact section of the cushioning member when the blade comes into contact with the cushioning member will be described with reference to FIG. 6.

Figure 6:
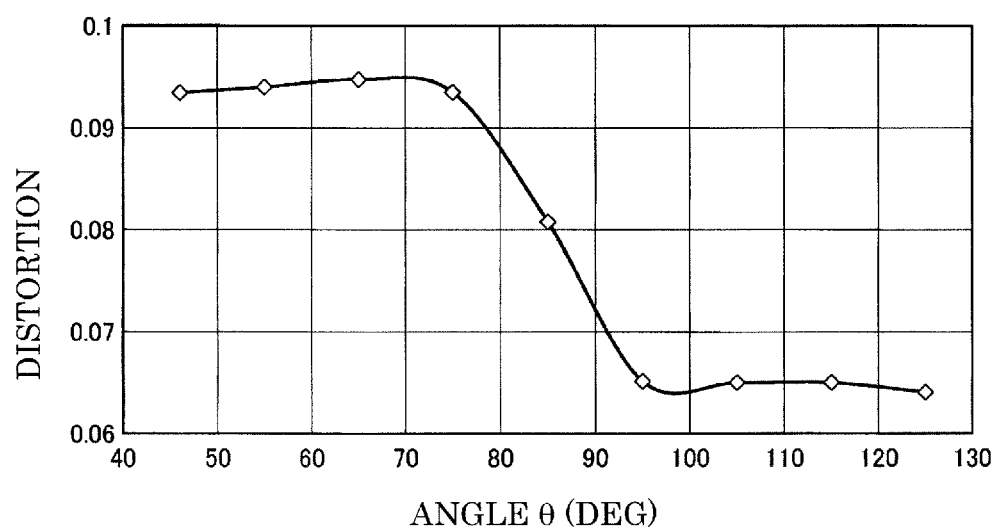
FIG. 6 is a graph showing a result of a simulation of the amount of distortion produced in the surface of a contact section of the cushioning member when a blade comes into contact with the cushioning member.

FIG. 6 is a graph showing a result of the simulation of the amount of distortion produced in the surface of the contact section of the cushioning member when the blade comes into contact with the cushioning member. The horizontal axis of FIG. 6 represents the angle θ between the direction in which the connecting sections 55 extend and the tangential direction A. The vertical axis of FIG. 6 represents the distortion produced in the surface of the contact section 51 and expressed in the form of the ratio of the amount of displacement of the surface of the contact section 51 in the first direction L1 to the amount of displacement thereof in the second direction L2. FIG. 6 shows a result of the simulation in a case where in the focal-plane shutter 10 according to the present embodiment, the angle of the connecting sections 55 of the cushioning member 50 with respect to the second direction L2 is changed.

When the angle of the connecting sections 55 of the cushioning member 50 with respect to the second direction L2 is increased to increase the angle θ between the direction in which the connecting sections 55 extend and the tangential direction A, and the angle θ becomes greater than about 75°, the distortion produced in the surface of the contact section 51 starts decreasing. When the angle θ is further increased, the distortion produced in the surface of the contact section 51 further decreases until the angle θ reaches about 95° and then stays roughly constant irrespective of the angle θ.

The result described above shows that increasing the angle of the connecting sections 55 of the cushioning member 50 with respect to the second direction L2 reduces the amount of distortion produced in the surface of the contact section due to the slide motion between the side edge 35b of the blade 31b and the contact section 51 of the cushioning member 50. Therefore, the amount of wear of the contact section can be reduced, whereby production of foreign matter can be suppressed.

Further, since the contact section 51 is arranged in a position corresponding to an inner portion between the opposite ends of the blade 31b in the unfolded position, a situation in which an end portion of the blade 31b comes into contact with the contact section 51 can be avoided. Therefore, a situation in which an end portion of the blade 31b scrapes the contact section 51 and produces foreign matter can be avoided.

Since the optical apparatus 1 according to the present embodiment includes the focal-plane shutter 10, the optical apparatus 1 is capable of suppressing production of foreign matter.

The invention is not limited to the embodiment described above with reference to the drawings, and a variety of variations are conceivable within the technical range of the invention.

For example, in the embodiment described above, the cushioning member 50 has the pair of connecting sections 55 inclining with respect to the second direction L2, but the pair of connecting sections 55 are not necessarily employed.

Figure 7:
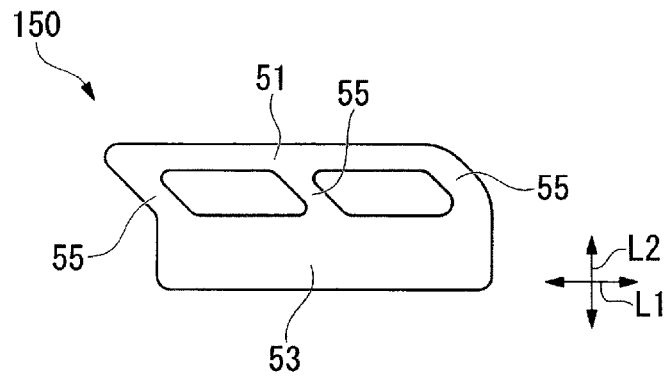
FIG. 7 is a front view showing a variation of the cushioning member.
Figure 8:
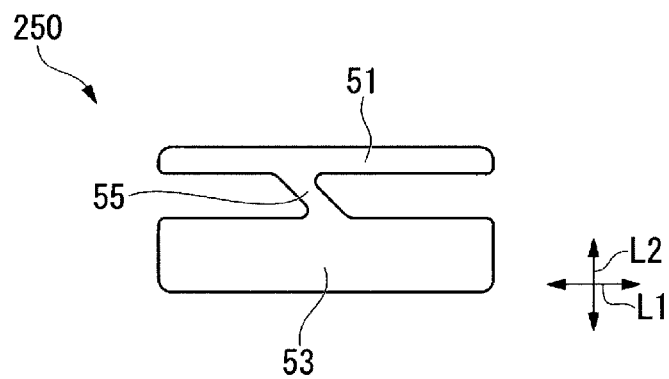
FIG. 8 is a front view showing another variation of the cushioning member.
Figure 9:
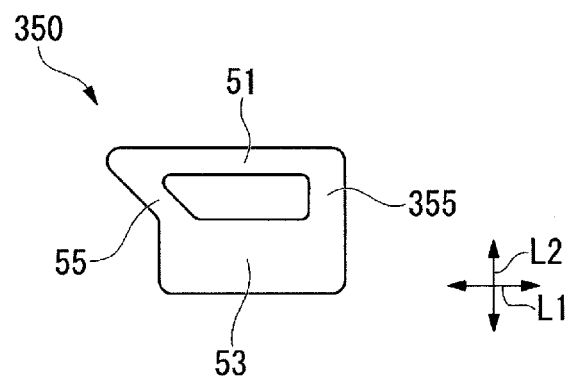
FIG. 9 is a front view showing still another variation of the cushioning member.

FIGS. 7 to 9 are front views showing variations of the cushioning member.

For example, a cushioning member 150 may have three or more connecting sections 55 inclining with respect to the second direction L2, as shown in FIG. 7.

A cushioning member 250 may have a single connecting section 55, which is arranged in an intermediate portion of the cushioning member 250 in the first direction L1 and connects the contact section 51 and the holding section 53 to each other, as shown in FIG. 8.

A cushioning member 350 may be configured to have a connecting section 55, which inclines with respect to the second direction L2 and extends in the oblique direction, and a connecting section 355, which extends along the second direction L2, as shown in FIG. 9. According to this configuration, the contact section 51 can be readily displaced along with the blade 31b, as compared with the configuration in which all connecting sections extend along the second direction L2, and a situation in which the contact section 51 and the side edge 35b of the blade 31b slide on each other can be avoided, whereby the amount of wear of the contact section 51 can be reduced.

Further, in the embodiment described above, the front end section of the rear curtain drive arm 41b is located inside the circumferential edge of the blade 31b when viewed in the direction in which the opening 12 passes through the base plate 11, but the configuration of the front end portion described above is not necessarily employed.

Figure 10:
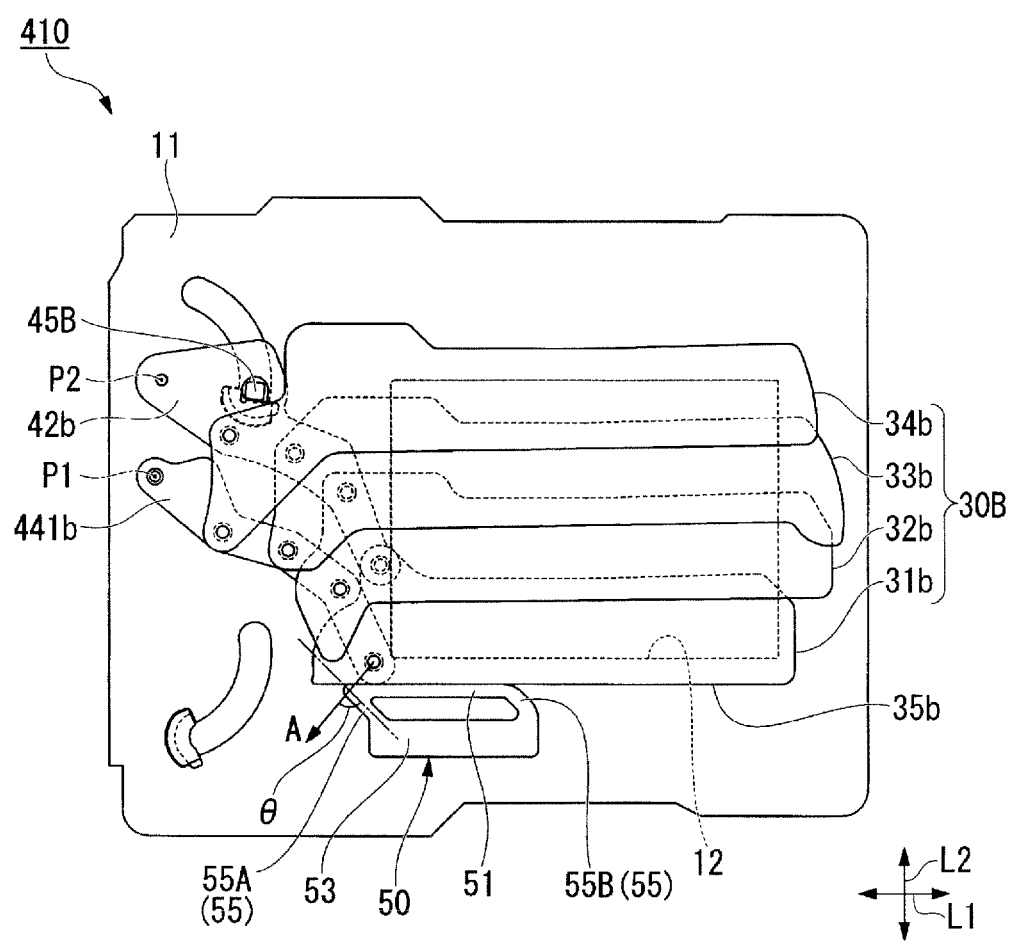
FIG. 10 describes a focal-plane shutter according to a first variation and is a front view primarily showing the base plate, the rear curtain, and the cushioning member.

FIG. 10 describes a focal-plane shutter according to a first variation and is a front view primarily showing the base plate, the rear curtain, and the cushioning member.

As in the case of a focal-plane shutter 410 shown in FIG. 10, the front end of a rear curtain drive arm 441b may be so arranged as to flush, when the blade 31b is in the unfolded position, with the side edge 35b of the blade 31b when viewed in the direction in which the opening 12 passes through the base plate 11. The front end of the rear curtain drive arm 441b along with the blade 31b comes into contact with the contact section 51.

According to this configuration, since the rear curtain drive arm 441b along with the blade 31b comes into contact with the contact section 51, the movement of the rear curtain drive arm 441b, which moves along with the blade 31b, can be reliably stopped.

When the blade 31b is in the unfolded position, the front end of the rear curtain drive arm 441b coincides with the side edge 35b of the blade 31b when viewed in the direction in which the opening 12 passes through the base plate 11 in the present example but may instead protrude from the side edge 35b of the blade 31b.

Further, in the embodiment described above, the focal-plane shutter 10 includes one cushioning member 50, but the number of cushioning members is not limited to one.

Figure 11:
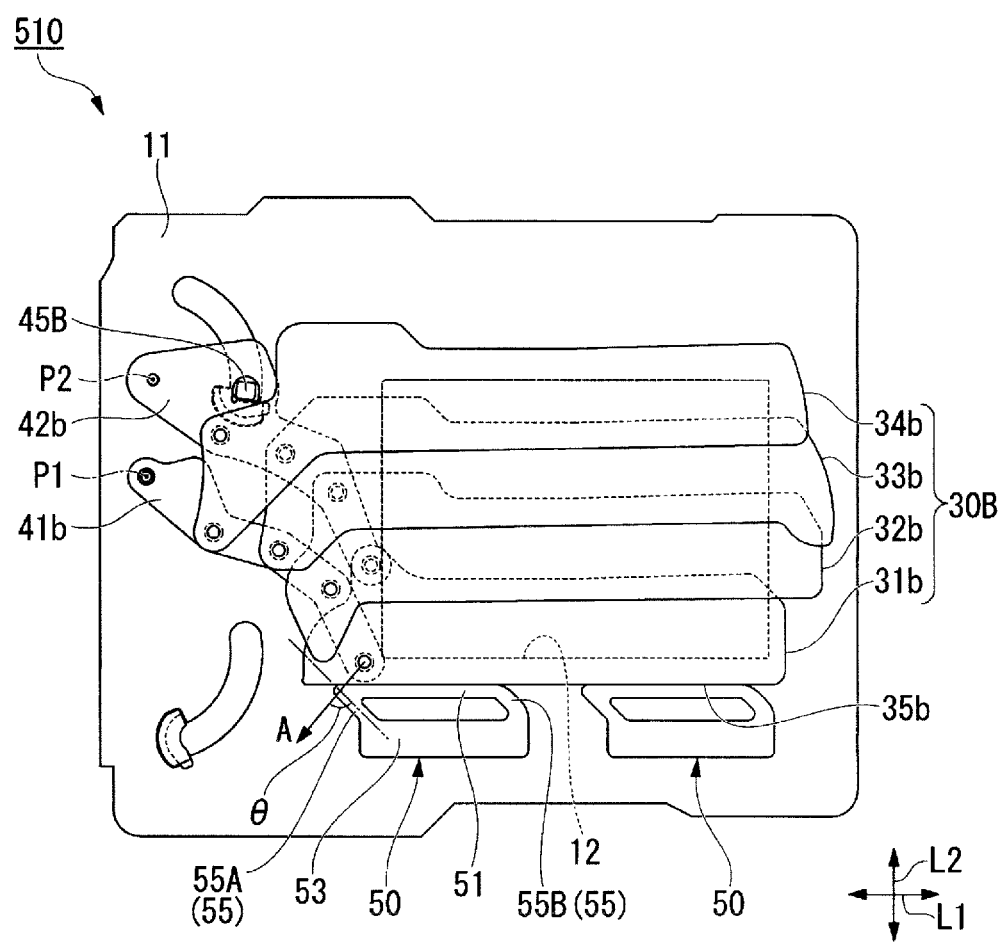
FIG. 11 describes a focal-plane shutter according to a second variation and is a front view primarily showing the base plate, the rear curtain, and the cushioning member.

FIG. 11 describes a focal-plane shutter according to a second variation and is a front view primarily showing the base plate, the rear curtain, and the cushioning member.

A focal-plane shutter 510 may include a plurality of (two in the present variation) cushioning members 50, as shown in FIG. 11.

According to this configuration, since the blade 31b is allowed to come into contact with the plurality of cushioning members 50 in the unfolded position of the rear curtain 30B, the movement of the blade 31b can be reliably stopped. Further, since force that originates from the blade 31b and acts on the cushioning members 50 can be spread, the amount of wear of the contact section 51 can be further reduced, whereby production of foreign matter can be further suppressed.

In the embodiment described above, the cushioning member 50 is arranged in a position where the cushioning member 50 comes into contact with the side edge 35b of the blade 31b in the unfolded position, but the cushioning member 50 is not necessarily arranged as described above. The cushioning member 50 may be so arranged as to separate in the second direction L2 from the side edge 35b of the blade 31b in the unfolded position. As a result, when the rear curtain 30B moves from the retracted position to the unfolded position, the side edge 35b of the blade 31b that overruns the intended unfolded position is allowed to come into contact with the cushioning member 50.

In the embodiment described above, the cushioning member 50 is configured to come into contact with the side edge 35b of the blade 31b of the rear curtain 30B, but the configuration described above is not necessarily employed. The cushioning member 50 may instead be configured to come into contact with a side edge 35a of the blade 31a of the front curtain 30A.

In addition to the above, each constituent element in the embodiment described above can be replaced with a known constituent element as appropriate to the extent that the replacement does not depart from the substance of the invention.

What is claimed is:

1. A focal-plane shutter comprising:
   a substrate plate having an opening and extensive in a deployment direction;
   an arm rotatably supported on the substrate around a rotation axis;
   a set of blades arranged in an overlapping manner in an optical axis direction perpendicular to the deployment direction and each extensive in a longitudinal direction perpendicular to both the optical direction and deployment direction,
   wherein each of the blades is rotatably attached to the arm at hinges so that the set of blades is collectively driven by rotation of the arm to retract in a retraction direction opposite to the deployment direction to retracted positions where the set of blades increases their overlapping areas among them to open the opening and to deploy in the deployment direction to deployed positions where the set of blades reduces their overlapping areas among them to close the opening, and
   wherein the set of blades includes a leading blade having a leading longitudinal edge and being deployed in the deployment direction ahead of a rest of the blades in the set; and
   a cushioning member made of an elastically deformable material and secured on the substrate plate,
   the cushioning member comprising:
      a contact section extensive in the longitudinal direction and movable relative to the substrate plate, the contact section being position to come into contact with the leading longitudinal edge of the leading blade upon arrival of the leading blade at its deployed position from the retracted position;
      a holding section extensive in parallel with the contact section secured on the substrate plate, the holding section movably holding the contact section; and
      a connecting section configured to connect the contact section and the holding section to each other in a movable fashion relative to each other, the connecting section being extensive in a length direction at an angle defined counterclockwise from a line tangential, at the hinge connecting the arm and the leading blade, to a circle defined to run through the hinge connecting the arm and the leading blade around the rotation axis of the arm, wherein the angle is within a range greater than or equal to 75° and smaller than or equal to 125°.

2. The focal-plane shutter according to claim 1, wherein the cushioning member comprises a second connecting section and is formed in an inclined parallelogram with a hole formed in the cushioning member and surrounded by the contact section, the holding section, the connecting section and the second connecting section.

3. The focal-plane shutter according to claim 1, wherein the arm has a distal end portion which is configured to come into contact with the contact section of the cushioning member upon arrival of the leading blade at the deployed position from the retracted position.

4. The focal-plane shutter according to claim 1, wherein the contact section is positioned with a clearance from the leading longitudinal edge of the leading blade settled at the deployed position.

5. An optical apparatus comprising the focal-plane shutter according to claim 1.

* * * * *

UNITED STATES PATENT AND TRADEMARK OFFICE
CERTIFICATE OF CORRECTION

PATENT NO. : 9,671,678 B2  
APPLICATION NO. : 15/227478  
DATED : June 6, 2017  
INVENTOR(S) : Shoichi Tokura et al.

Page 1 of 1

It is certified that error appears in the above-identified patent and that said Letters Patent is hereby corrected as shown below:

In the Claims

Claim 1, Column 12, Line 10, before "to come into", please delete "position" and replace with --positioned--

Signed and Sealed this
Fourth Day of June, 2019

Andrei Iancu
*Director of the United States Patent and Trademark Office*